United States Patent
Yamada

(10) Patent No.: US 10,367,966 B2
(45) Date of Patent: Jul. 30, 2019

(54) IMAGE READING DEVICE AND IMAGE DATA TRANSMISSION METHOD

(71) Applicant: BROTHER KOGYO KABUSHIKI KAISHA, Nagoya, Aichi (JP)

(72) Inventor: Takatsugu Yamada, Aichi (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 15/849,865

(22) Filed: Dec. 21, 2017

(65) Prior Publication Data

US 2018/0183969 A1  Jun. 28, 2018

(30) Foreign Application Priority Data

Dec. 26, 2016 (JP) .................. 2016-251818

(51) Int. Cl.
*H04N 1/32* (2006.01)
*H04N 1/00* (2006.01)
*G06F 3/00* (2006.01)

(52) U.S. Cl.
CPC ......... *H04N 1/32101* (2013.01); *G06F 3/002* (2013.01); *H04N 1/00148* (2013.01); *H04N 1/00214* (2013.01); *H04N 2201/3228* (2013.01)

(58) Field of Classification Search
CPC ........... H04N 1/32101; H04N 1/00148; H04N 1/00214; H04N 1/00798; H04N 1/00244; H04N 1/00477; H04N 1/4413; H04N 2201/0081; H04N 2201/0094; G06F 3/002

See application file for complete search history.

(56) References Cited

U.S. PATENT DOCUMENTS

| 2002/0093582 A1* | 7/2002 | Aoki | H04N 1/00137 348/333.02 |
| 2007/0195375 A1* | 8/2007 | Morimoto | H04N 1/00222 358/407 |

FOREIGN PATENT DOCUMENTS

| JP | 2003-296163 A | 10/2003 |
| JP | 2003-296217 A | 10/2003 |
| JP | 2004-192500 A | 7/2004 |
| JP | 2005-318545 A | 11/2005 |
| JP | 2007-228079 A | 9/2007 |

* cited by examiner

*Primary Examiner* — Nelson D. Hernández Hernández
(74) *Attorney, Agent, or Firm* — Scully, Scott, Murphy & Presser, P.C.

(57) ABSTRACT

An image reading device is configure to generate an initial data name of image data to be transmitted to a plurality of designated external devices. The image reading device transmits a list request, to each of the plurality of external devices, to transmit a list of data names regarding image data stored in respective external devices. It is determined whether the initial data name is included in at least one of the lists. The image reading device changes the initial data name to another data name which is included in none of the lists when it is determined that the initial data name is included in at least one of the lists. Otherwise, the image reading device does not change the initial data name. Thereafter, the image reading device transmits the image data to the first external device and the second external device using the data name determined as above.

10 Claims, 9 Drawing Sheets

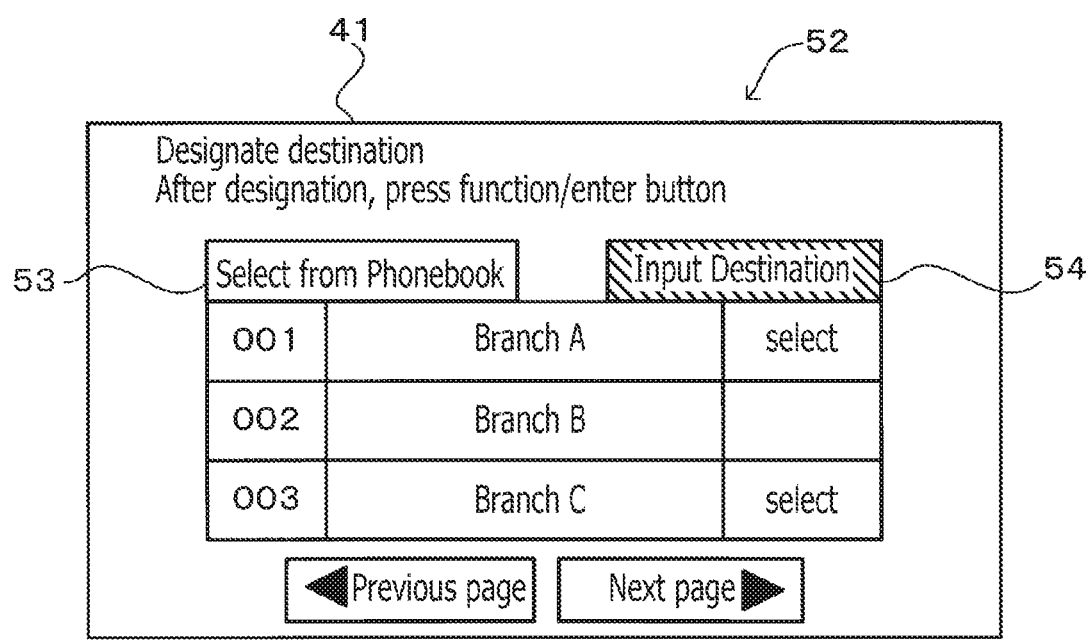

| Order | Transmission Method | Destination Address | Log-In Name | Password |
|---|---|---|---|---|
| 1 | FTP | Profiles A | aaa | 111 |
| 2 | CIFS | Shared Folder Address A | bbb | 222 |
| 3 | FTP | Profiles B | ccc | 333 |
| 4 | FTP | Profiles C | ddd | 444 |
| 5 | CIFS | Shared Folder Address B | eee | 555 |
| 6 | FTP | Profiles D | fff | 666 |

FIG. 4

IMAGE READING DEVICE AND IMAGE DATA TRANSMISSION METHOD

CROSS-REFERENCE TO RELATED APPLICATIONS

This application claims priority under 35 U.S.C. § 119 from Japanese Patent Application No. 2016-251818 filed on Dec. 26, 2016. The entire subject matter of the application is incorporated herein by reference.

BACKGROUND

Technical Field

The present disclosures relate to an image reading device and an image data transmitting method. More specifically, the present disclosures relate to a technique of transmitting image data, which is generated by an image reading device, to external devices.

Related Art

Conventionally, there has been known a technique of reading an image on an original document and generate image data with an image reading device capable of communicating with external devices, and transmitting the generated image data to external devices designated as destinations.

As a conventional technique of transmitting data to an external device (i.e., a destination external device), there has been known a system including a data communication device and server, the data communication device being configured to add a character string and data information to the data when transmitting the data.

SUMMARY

The conventional technique described above is advantageous since, in a destination external device, previously stored data will not be overwritten by newly transmitted data since the data names do not overlap. However, in the conventional technique described above, a case where there are plurality of external devices to which the data is transmitted is not considered.

When, for example, image data is transmitted to a plurality of external devices (i.e., destinations), if different data names are given for respective destinations, the same image data has different names in respective external devices. In such a case, it is inconvenient since, for example, it becomes impossible to check whether the same data is stored in the respective external devices based on the data names.

If the data having a particular name is transmitted to all the destination external devices, the above problem is resolved. However, the destination external devices respectively may have existing image data and names of the image data are different in respective external devices. Therefore, a case where the name of the newly transmitted image data may overlap the name of the existing image data in some external devices, while may not overlap in the other of the external devices. If the name of the image data newly transmitted from an image reading device is the same as the name of the existing image data, the existing image data is replaced with the newly transmitted image data. In order to avoid such a situation, the image reading device cannot transmit the image data. As above, when the image data is transmitted from the image reading device to the plurality of external devices, the name of the image data should not cause any problems.

In consideration of the above problem, the present disclosures provide a technique which make it possible that, when a piece of image data is transmitted from the image reading device to a plurality of destination external devices, the name of the image data transmitted to the destination external devices does not overlap the name of the image data existing in respective destination external devices, thereby overwritten of the image data in the destination external devices being prevented.

According to aspects of the present disclosures, there is provided an image reading device, having an image reader configured to read an image on an original document and generate image data corresponding to the image on the original document, a communication interface configured to communicate with a first external device and a second external device, a storage, and a controller. When the first external device and the second external device are designated as transmission destinations of the image data, the controller is configured to execute a generating process of controlling the image reader to read the image on the original document and generate the image data, a storing process of storing the image data generated in the generating process in the storage with assigning an initial data name to the image data, a list requesting process of controlling the communication interface to transmit a first list request, to the first external device, requesting to transmit a first list to the image reading device, the first list being a list of data names regarding image data stored in the first external device, and transmit a second list request, to the second external device, requesting to transmit a second list to the image reading device, the second list being a list of data names regarding image data stored in the second external device, to the image reading device, a list receiving process of controlling the communication interface to: receive the first list transmitted from the first external device, and receive the second list transmitted from the second external device, a determining process of determining whether a data name same as the initial data name of the image data stored in the storage is included in at least one of the first list and the second list, a data name changing process of: changing the initial data name of the image data stored in the storage to another data name different from the initial data name and included in neither of the first list and the second list when it is determined in the determining process that the data name same as the initial data name of the image data stored in the storage is included in at least one of the first list and the second list, and not changing the initial data name of the image data stored in the storage when it is determined in the determining process that the data name same as the initial data name of the image data stored in the storage is not included in any of the first list and the second list, a transmission process of controlling the communication interface to transmit the image data stored in the storage to the first external device and the second external device after execution of the data name changing process.

According to aspects of the disclosures, there is provided an image reading device, having an image reader configured to read an image on an original document and generate image data corresponding to the original document, a communication interface configured to communicate with a plurality of external devices, a storage, and a controller. When the first external device and the second external device are designated as transmission destinations of the image data, the controller is configured to execute a storing process of storing the image data generated in the generating process in the storage with assigning an initial data name to the image data, a list requesting process of controlling the communication interface to transmit a list request, to each of the plurality of external devices, requesting to transmit a list to the image reading device, the list being a list of data names regarding image data stored in the each of the plurality of external devices, a list receiving process of controlling the communication interface to receive the list transmitted from each of the plurality of external devices, a determining process of determining whether a data name same as the initial data name of the image data stored in the storage is included in at least one of the lists respectively received from the plurality of external devices, a data name changing process of changing the initial data name of the image data stored in the storage to another data name different from the initial data name and included in neither of the lists respectively received from the plurality of external devices when it is determined in the determining process that the data name same as the initial data name of the image data stored in the storage is included in at least one of the lists respectively received from the plurality of external devices, and not changing the initial data name of the image data stored in the storage when it is determined in the determining process that the data name same as the initial data name of the image data stored in the storage is not included in any of the lists received from the plurality of external devices, a transmission process of controlling the communication interface to transmit the image data stored in the storage to each of the plurality of the external devices after execution of the data name changing process.

An image data transmission method of an image reading device having an image reader configured to read an image on an original document and generate image data corresponding to the original document, a communication interface configured to communicate with a first external device and a second external device, and a storage. When the first external device and the second external device are designated as transmission destinations of the image data, the method includes a generating step of controlling the image reader to read the image on the original and generate the image data, a storing step of storing the image data generated in the generating step in the storage with assigning an initial data name to the image data, a list requesting step of controlling the communication interface to transmit a first list request, to the first external device, requesting to transmit a first list to the image reading device, the first list being a list of data names regarding image data stored in the first external device, and transmit a second list request, to the second external device, requesting to transmit a second list to the image reading device, the second list being a list of data names regarding image data stored in the second external device, a list receiving step of controlling the communication interface to: receive the first list transmitted from the first external device, and receive the second list transmitted from the second external device, a determining step of determining whether a data name same as the initial data name of the image data stored in the storage is included in at least one of the first list and the second list, a data name changing step of changing the initial data name of the image data stored in the storage to another data name different from the initial data name and included in nether of the first list and the second list when it is determined in the determining step that the data name same as the initial data name of the image data stored in the storage is included in at least one of the first list and the second list, and not changing the initial data name of the image data stored in the storage when it is determined in the determining step that the data name same as the initial data name of the image data stored in the storage is not included in any of the first list and the second list, and a transmission step of controlling the communication interface to transmit the image data stored in the storage to the first external device and the second external device after execution of the data name changing step.

BRIEF DESCRIPTION OF THE ACCOMPANYING DRAWINGS

FIG. 1 is a block diagram showing a configuration of an MFP according to the present disclosures.

FIG. 2 schematically illustrates a data name changing list.

FIG. 3 shows an example of a destination designation screen.

FIG. 4 shows an example of a transmission destination list.

DETAILED DESCRIPTION OF THE EMBODIMENT

Hereinafter, referring to the accompanying drawings, an MFP 100 according to an embodiment of the present disclosures will be described in detail.

Figure 1:
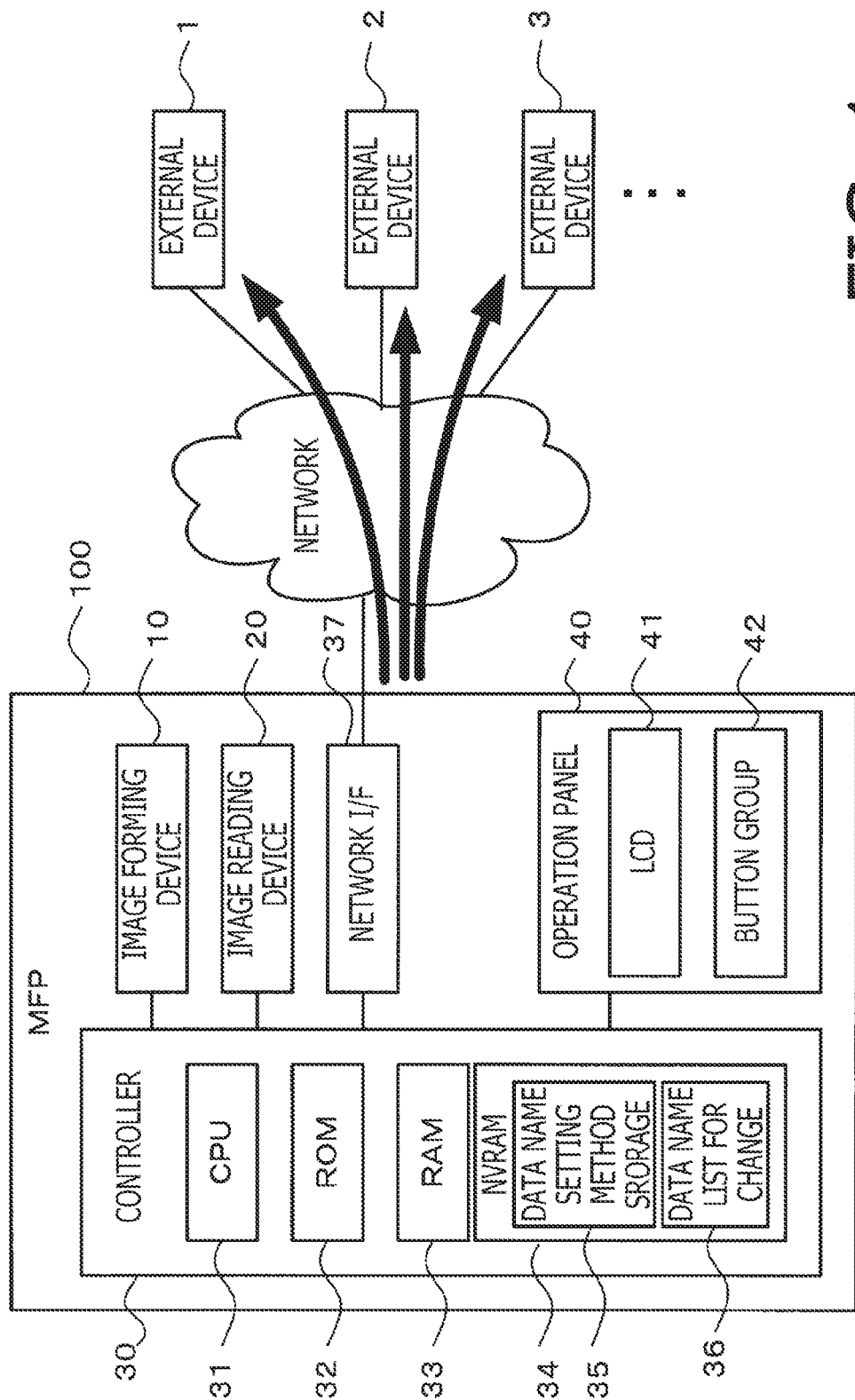

The MFP 100 has a controller 30 which includes, as shown in FIG. 1, a CPU 31, a ROM 32, a RAM 33 and an NVRAM 34. The MFP 100 also has an image forming device 10, an image reading device 20 and a network I/F 37, an operation panel 40, which are electrically connected to the controller 30.

The image forming device 10 is configured to print an image on a printing sheet. The image forming device 10 may employ an electrophotographic image forming method or an inkjet printing method. Further, the MFP 100 may be configured to form a color image or only a monochromatic image. Furthermore, the MFP 100 may perform a duplex printing, or only an simplex printing.

The image reading device 20 is configured to read an image formed on an original. The image reading device 20 may read an image in accordance with a CCD method, or a CIS method. The MFP 100 according to the present disclosure may read a color image, or only a monochromatic image. The image reading device 20 is an example of a reader.

The ROM 32 stores control programs to control operations of the MFP 100, various settings and initial values. The RAM 33 is used as a work area in which retrieved control programs are developed, or various pieces of data are temporarily stored. The RAM 33 is an example of a storage. The NVRAM 34 is used to store various pieces of data such as image data, various setting, and user information. For example, the NVRAM 34 includes a data name setting method storage 35 storing whether a data name is to be set automatically or manually.

In the NVRAM 34, a name change list 36 for changing an initial data name (hereinafter, simply referred to as the name change list 36) storing data name changing methods is stored. As shown in FIG. 2, in the name change list 36, a plurality of changing methods are registered. The reason why the plurality of changing methods are registered is, when the data name is automatically changed, to make a possibility to avoid overlapping of the data name high with suppressing the changed data name being unnecessarily redundant. In order to improve a possibility that the overlapping of the data name, each changing method is configured such that relevance with a method of generating an initial data name or other changing methods is low. In the name change list 36, the data names after changed are registered in a short length order of the name.

The initial data name is created such that, for example, information corresponding to the date when the image of an original subject to transmission is read by the image reading device at the end of a predetermined character string "IMG". It is noted that the "date" does not include time information such as hour, minute and/or second. In the name change list 36 shown in FIG. 2, as a first method (i.e., rule No. 1), a method of adding information corresponding to "time" at the end of the "initial data name" is registered. As a second method (i.e., rule No. 2), a method of adding information corresponding to "device-intrinsic information" and information corresponding to "serial number" serially at the end of the "initial data name" is registered. Further, in the name change list 36, as a third method (i.e., rule No. 3), a method adding information corresponding to "time", information corresponding to "device-intrinsic information" and information corresponding to a "serial number" at the end of the "initial data name" in this order is registered.

In the description above (i.e., when the data name is changed), the "time" is a time when the image on the original document subject to transmission has been read. For example, the "time" includes values of hour, minute and second. The "device-intrinsic information" is information identifying the MFP 100, and may be, for example, a manufacturing number of the MFP 100, a machine address of the MFP 100, an e-mail address and the like. The "serial number" is a consecutively counted number when the image reading device 20 is controlled to read original documents. It is noted that the generation method of the initial data is an example of a first generation rule. Further, each of the changing methods registered as rules 1-3 in the name change list 36 is an example of a second generation rule.

The CPU 31 controls operations of respective components of the MFP 100 in accordance with the control programs retrieved from the ROM 32 with storing results of execution of the control programs in the RAM 33 or NVRAM 34. The CPU 31 is an example of a controller. It is noted that the controller 30 may be the controller set forth in the claims. It is noted that the controller 30 is a collective term including hardware used in the controlling operations of the MFP 100, and need not correspond to a single piece of hardware existing in the MFP 100.

The network I/F 37 is hardware used to communicate with an external device connected to a network. A communication method employed in the network I/F 37 may be a wireless or wired method. The network I/F is an example of a communication interface.

The operation panel 40 is provided with an LCD 41 and a button group. The LCD 41 is an example of a display device. The button group is an example of an inputting device. The controller 40 displays various pieces of information such as an operation state and/or a message for the user on the LCD 41 of the operation panel 40. The LCD 41 may be configured as a touch panel through which an input operation can be performed. In such a case, the MFP 100 may be configured to display various buttons on the LCD 41, and receive instructions based on the touched position on the touch panel. It is noted that when the LCD 41 is configured as the touch panel, the LCD 41 is an example of the inputting device.

The button group 42 includes a power button, an execution button, a cancel button and numeral keys. The controller 30 is configured such that, when an operation with respect the button group 42 is received, the controller 30 receives a signal which is generated in response to an operation of the button, thereby receiving an input of an instruction.

According to the embodiment, it is assumed that external devices 1, 2 and 3 are connected to the network. Examples of the external devices 1, 2 and 3 may include a server, a personal computer (PC), a mobile phone, a printer, and an MFP.

Next, a plural-destination transmission function implemented in the MFP 100 will be described. The plural-destination transmission function is a function of transmitting image data of an image read by the MFP 100 to a plurality of external devices.

For executing a job using the plural-destination transmission function, transmission destinations are stored, in advance, in the MFP 100. For example, the transmission destinations may be selected from an address book stored in the MFP 100. Alternatively or optionally, the transmission destinations may be directly input by the user. Further optionally or alternatively, the transmission destinations may be set to the MFP 100 through a PC.

For example, the MFP 100 may display a destination designation screen 52 as shown in FIG. 3 on the LCD 41. On the destination designation screen, a tag 53 and tag 54 are displayed. When the tag 53 is selected, the transmission destination can be selected from the address book. When the tag 54 is selected, the transmission destinations are directly input by the user.

When the user selects the tag 53, the address book is displayed on the LCD 41. On the address book displayed on the LCD 41, names of users of external devices subject to selection are indicated. The user may designate the transmission destinations by operating the button group 42 to select the names of the users. As shown in FIG. 2, the selected destinations are indicated by an indication of "selected". Therefore, the user can confirm whether selection has been made for each name of the users.

It is noted that, the MFP 100 creates a telephone book such that telephone book records are generated with the names of the users, transmission methods and transmission addressed are mutually associated, and stored in a telephone book database. The telephone book database is stored in the NVRAM 34.

In the field of the transmission method, protocols to be used for transmitting image data to the external devices are registered. The protocols used may include an FTP (file transfer protocol), an SMB (server message block), a CIFS (common internet file system), an NFS (network file system), and an HTTP (hypertext transfer protocol). In addition to differences of the protocols to be used, even if the same protocol is used, the destinations may be different, or even if the destinations are the same, portions for storing the image data (e.g., recording media, or recording areas) may be different.

In the field of the destination address (see FIG. 4), information to identify the external devices is registered. In the field of the destination address, when, for example, a protocol (e.g., FTP) regarding data transmission is registered in the field of the transmission method, a profile containing connection information of a connection destination is registered. When a network (e.g. CIFS) is registered in the field of the transmission method, a shared folder address identifying a shared folder is registered.

In the field of the log-in name (see FIG. 4), information used to log in the external devices is registered. In the field of the password, passwords which are required to access storage areas of the external devices are registered. That is, in the phonebook data based, authentication information to establish a communication with the external devices is stored.

As above, in the MFP 100, when the name is selected in the telephone book, the transmission method and the transmission address corresponding to the selected external device, a login name and a password can be obtained easily.

On the other hand, for example, when an address which is not registered in the telephone book is to be designated, the user may select the tag 54. Then, an address input screen encouraging the user to manually input the transmission method and the transmission address is displayed on the LCD 41. Then, the user may designate the destination by inputting the transmission method and the destination address by operating the button group 42. As above, the MFP 100 can accept a destination which is not registered in the telephone book and obtain authentication information thereof.

When the destination address is received, the MFP 100 creates the transmission destination list. The MFP 100 generates the transmission destination records containing the transmission method, the destination address, the log-in name and the password in accordance with the order of designation, and registers the record with the transmission destination address. For example, it is assumed that, in the telephone book shown in FIG. 3, if a branch A is designated first, and then the branch C is designated. In such a case, as shown in FIG. 4, as the first record, the protocol "FTP" which is used in the FTP server A of the branch A is registered as the transmission method, and "Profiles A" of the FTP server A is registered as the destination address. Further, a log-in name "aaa" for the FTP server A is registered in the field of the log-in name, and a password "111" is registered in the field of the password. As the second record, the protocol "CIFS" which is used in the CIFS server A of the branch C is registered as the transmission method, while the shared folder address of the CIFS server A will be registered as the destination address. Further, a log-in name "bbb" is registered in the field of the log-in name, and a password "222" is registered in the field of the password.

When the transmission destination list has been created, the MFP 100 controls the image reading device 20 to read an image on an original document and generates image data. Then, the MFP 100 controls the RAM 33 to store the thus generated image data. Thereafter, the MFP 100 connects with the external devices in accordance with the order of the transmission destination list, and transmits the image data stored in the RAM 33. That is, the MFP 100 completes transmission of the image data to the external device having been registered earlier, and thereafter, the MFP 100 starts transmitting the image data to the external device having been registered later.

If the data name of the image data to be transmitted to the external device overlaps one or more of the data names of the image data having already been stored in the external devices, the MFP 100 cannot transmit the image data on the original document to the external devices storing the image data having the same data name as the image data on the original document to be transmitted from the MFP 100 in order to prevent the image data stored in the external devices overwritten with the transmitted image data on the original document. If transmission of the image data to some of the external devices has been successfully completed, but transmission to the other external devices has been failed, there will be no guarantee that the same image data is remained in all the destination external devices, and the successfully completed data transmission becomes useless.

According to the embodiment, the MFP 100 obtains a list of the data name regarding the image data stored in the external devices before transmitting the image data, and determines whether the data name of the image subject to transmission overlaps one of the data names included in the lists obtained from the plurality of external devices. When it is determined that the data name of the image data subject to transmit is not included in any of the lists obtained from the plurality of external devices, the MFP 100 transmits the image data to the plurality of external devices sequentially without changing the data name thereof. In contrast, when it is determined that the data name of the image data subject to transmission is included in one or more of the lists obtained from the plurality of external devices, the MFP 100 transmits the image data to the plurality of external devices sequentially, after changing the data name of the image data subject to transmission.

Next, a plural-destination transmission process executed by the MFP 100 will be described with reference to the flowchart shown in FIG. 5. The plural-destination transmission process is executed by the CPU 31 in response to receipt of the plural-destination transmission instruction which is input through the button group 42.

In the plural-destination transmission process, the CPU 31 firstly receives user's selection of the external devices which are the transmission destinations (S1). The external devices which are the transmission destination may be designated, for example, through the destination designation screen 52 displayed on the LCD 41. In this case, the external devices are selected from the telephone book stored in the NVRAM 34 of the MFP 100 and/or manually designated through the button group 42.

Next, the CPU 31 receives a read setting through the button group 42 (S2). In the read setting, a condition to read the image on the original document and generate the image data is set. The read setting may include, for example, a setting of data format when the image data is stored in the RAM 33.

Thereafter, when a start instruction is received through the button group (S3: YES), the CPU 31 stores information identifying the external devices in the NVRAM 34 as the transmission destinations (S4). That is, the CPU 31 creates the transmission destination list 51 based on the external devices designated in S1. Then, the CPU 31 stores the transmission destination list 51 in the NVRAM 34.

Next, the CPU 31 executes a list obtaining process (S5) to obtain lists of data names of stored image data from the external devices which are designated as destination in S1. The list obtaining process will be described in detail later.

Then, the CPU 31 causes the image reading device 20 to read the image on the original document, and generates the image data (S6). It is noted that a process in S6 is an example of a generating process. The image reading device 20 may read images on the original documents conveyed by a not-shown ADF or read an image of an original document which is placed on a platen by the user. At this stage, the CPU 31 controls the RAM 33 to store a time (i.e., hour, minute and second) when the image reading device 20 read the image on the original document.

Next, the CPU 31 obtains a serial number (S7). The serial number is a number of pages of the original document counted when the MFP 100 controls the image reading device 20 to read the original document.

Then, the CPU 31 executes an initial data name generating process (S8) to generate an initial data name, which is the firstly assigned name to identify the image data. A method of setting the initial name can be selected between an automatic setting method and a manual setting method. The automatic setting method is a method according to which the MFP 100 automatically generates the data name according to a certain generating rule. According to the present embodiment, when the automatic setting method is selected, the CPU 31 automatically generates the initial data name by adding information corresponding to a date when the CPU 31 controls the image reading device 20 to read the original document to a particular character string "IMG". The manual setting method is a method according to which the user generates the initial data name by operating the button group 42. For example, when the manual setting method is selected, the CPU 31 displays a data name setting screen on the LCD 41 and encourages the user to input the initial data name. The initial data name generation method will be described later.

Thereafter, the CPU 31 stores the image data in the RAM 33 (S9). The process in S9 is an example of a storing process. That is, the CPU 31 controls the RAM 33, for example, to name the image data of the image on the original document read in S6 the initial data name set in S8, and stores the same.

When, for example, the data format is set to a PDF in S2, the CPU 31 stores one piece of image data in the RAM 33 when an image of one sheet of the original document is read, or when images of a plurality of original sheets are read. On the other hand, when, for example, the data format is set to the JPEG in S2, the same number, as the number of pages of original document, of pieces of image data are stored in the RAM 33.

Next, the CPU 31 executes an overlap checking process (S10). In the overlap checking process, the CPU 31 determines whether the data name of the image data subject to transmission overlaps at least one of the data names of the image data stored in the plurality of external devices. When it is determined that the data name of the image data subject to transmission overlaps at least one of the data names of the image data stored in the plurality of external devices, the CPU 31 changes the name of the image data subject to submission. Specifically, in the overlap checking process, firstly the CPU 31 determines whether there is a data name same as the initial data name generated in S8 is included in the lists obtained from the plurality of external devices in S5. When it is determined that the data name same as the initial data name does not exist in the lists, the CPU 31 does not change the initial data name. When it is determined that the data name same as the initial data name is included in the lists, the CPU 31 changes the initial data name to one different from the initial data name. The overlap checking process will be described in detail later.

Thereafter, the CPU 31 transmits the image data to the plurality of external devices sequentially (S11). The process of S11 is an example of a transmission process. The CPU 31 establish a connection with each of the external devices in accordance with the order indicated in the transmission destination list 51, and transmits the image data to each of the external devices, sequentially.

When transmission of the image data is completed, the CPU 31 controls the LCD 41 to display the data name assigned to the transmitted image data (S12). Then, the user can visually recognize the data name of the image data which has been successfully transmitted.

Thereafter, the CPU 31 deletes the image data subject to transmission from the RAM 33 (S13). Then, the image data which has become unnecessary is removed from the RAM 33, thereby an available capacity of the RAM 33 can be secured. After deletion of the image data, the CPU 31 terminates the plural-destination transmission process.

Next, referring to a flowchart shown in FIG. 6, the list obtaining process, which is called in S5 of FIG. 5, will be described. By executing the list obtaining process, the CPU 31 is sequentially connected with the plurality of external devices and obtains the list of the data name from the connected external device.

In the list obtaining process, the CPU 31 initializes the order N of the external devices representing the order of transmission of the image data (S41). Thereafter, the CPU 31 add "1" to the order N (S42). Thereby, counting of the order N of the external devices, to which the image data is transmitted, is started.

Thereafter, the CPU 31 obtains the authentication information of the N-th transmission destination (S43). The order of the external devices to which the image data of the original document is to be transmitted is defined in the transmission destination list store in the RAM 33. Therefore, the CPU 31 retrieves the N-th order transmission destination record from the transmission destination list 51, and extracts the log-in name and the password registered in the retrieved transmission destination record as the authentication information.

Thereafter, the CPU 31 controls the network I/F 37 to attempt logging in to the N-th transmission destination external device (S44). That is, the CPU 31 controls the network I/F 37 to transmit the authentication (i.e., the log-in name and the password) obtained in S23 to the transmission destination address registered in the N-th order transmission destination record in accordance with the transmission method which is also registered in the N-th order transmission destination record, thereby the network connection with the N-th order external device being attempted.

The CPU 31 determines whether logging in to the N-th transmission destination has been made. When the is no response from the N-th transmission destination, the CPU 31 determines that logging in to the N-th transmission destination cannot be done (S45: NO). In this case, the CPU 31 controls the LCD 41 to display an indication of "connection failed" to notify that the connection with the N-th transmission destination cannot be established (S51). Thus, the user can recognize the reason why the image data cannot be transmitted is inability to establish a connection with the external device. Optionally, on the screen displayed at this stage, information identifying the external device with which the connection cannot be established. According to such a configuration, the user can recognized the external device with which the connection was failed, and may take optional steps, for example, of informing an administrator of the external device that the connection has not be established and ask the administrator to fix a problem.

After displaying the indication of "connection filed" on the LCD 41, the CPU 31 deletes the image data of the original document stored in the RAM 33 (S52). When it is found that the communication with one of the designated external device cannot be established, there will be no guarantee that the image data is transmitted to all the designated external devices. Therefore, it becomes unnecessary to transmit the image data of the image read by the image reading device 20 to any other one of the designated external devices. Accordingly, the CPU 31 the image data, which becomes unnecessary, from the RAM 33 and secure the available capacity of the RAM 33.

When the CPU 31 receives the reply from the N-th transmission destination external device, the CPU 31 determines that the log in in the N-th transmission destination can be done (S45: YES). In this case, the CPU 31 controls the network I/F 37 to transmit, to the N-th transmission destination external device, a list request requesting a list of data names regarding the image data stored in the N-th transmission destination external device (S46). The process of S46 is an example of a list requesting process. Each of the external devices has the list regarding the data names of the image data stored in the storage thereof. In the above process, the CPU 31 request the each external device to transmit the list to the MFP 100. It is noted that the list may be created by the CPU 31 side. That is, the CPU 31 may request each external device to transmit the data names regarding the image data stored therein, and create the list based on the received data names. Further, the list may correspond to each external device, or one list contains the data names of image data stored in all the external devices.

When the CPU 31 cannot obtain the list of the data names regarding the image data stored in the N-th transmission destination external device (S47: NO), the CPU 31 executes steps S51 onwards, to terminate the job of the plural-destination transmission function. Since each of the processes S51 and S52 is described above, description thereof will not be repeated here.

When the CPU 31 receives the list of the data names regarding the image data stored in the N-th transmission destination external device therefrom (S47: YES), the CPU 31 stores the received list in the RAM 33 (S48). The process of S47 is an example of a list receiving process. Thereafter, the CPU 31 logs off from the N-th transmission destination external device and disconnects the communication therewith (S49). The communication is disconnected so that other devices can make use of the N-th transmission destination external device until transmission of the image data to the N-th transmission destination external device is executed.

Then, the CPU 31 determines whether the CPU 31 has logged in to all the transmission destinations (S50). When it is determined that the CPU 31 has not logged in to all the transmission destinations (S50: NO), there is one or more external devices from which the list has not yet been received. Therefore, the CPU 31 returns to S42, and attempts to obtain the list of the data names regarding the image data stored in the next order external device. As above, the CPU 31 repeatedly executes steps S42-S50 to sequentially connect to the plurality of external devices in accordance with the order registered with the transmission destination list 51 and obtains the lists.

When it is determined that the CPU 31 has logged in all the transmission destinations (S50: YES), since the lists for all the designated external devices have been obtained, the CPU 31 proceeds to S6 (FIG. 5), and generates the image data by reading the image on the original document. That is, the CPU 31 reads the image on the original document and generates the image data after confirming that communication can be established with all the transmission destination external devices when the lists are obtained. Accordingly, an external device with which connection cannot be made is detected before reading the image on the original document, and it is avoided to unnecessarily execute reading of the image on the original document or transmitting the image data.

Next, the initial data name generating process called in S8 (FIG. 5) will be described with reference to the flowchart shown in FIG. 7. The CPU 31 executes the initial data name generating process to automatically or manually generates the initial data name.

The CPU 31 determines whether the initial data name is generated automatically or manually based on the information stored in the data name setting method storage 35 of the NVRAM 34.

Specifically, when an "automatic setting" is stored in the data name setting method storage 35 (S61: AUTO), the CPU 31 obtains the date when the image reading device 20 reads the original document subject to transmission (S62). Then, the CPU 31 adds the date obtained in S62 to the particular character string "IMG" to generates the initial data name (S63). Thereafter, the CPU 31 controls the RAM 33 to store the generated initial data name (S64).

By contrast, when a "manual setting" is stored in the data name setting method storage 35 (S61: MANUAL), the CPU 31 controls the LCD 41 to display an initial data name input screen (S65) on which an input field of the initial data name is provided. The CPU 31 keeps displaying the initial data name input screen until the user operates the button group 42 to input an arbitrary character string in the initial data name input field and depress the enter (confirm) button (S66: NO). When the user inputs the arbitrary character string and depresses the enter (confirm) button (S66: YES), the CPU 31 stores the character string input by the user in the RAM 33 as the initial data name (S64).

Figure 5:
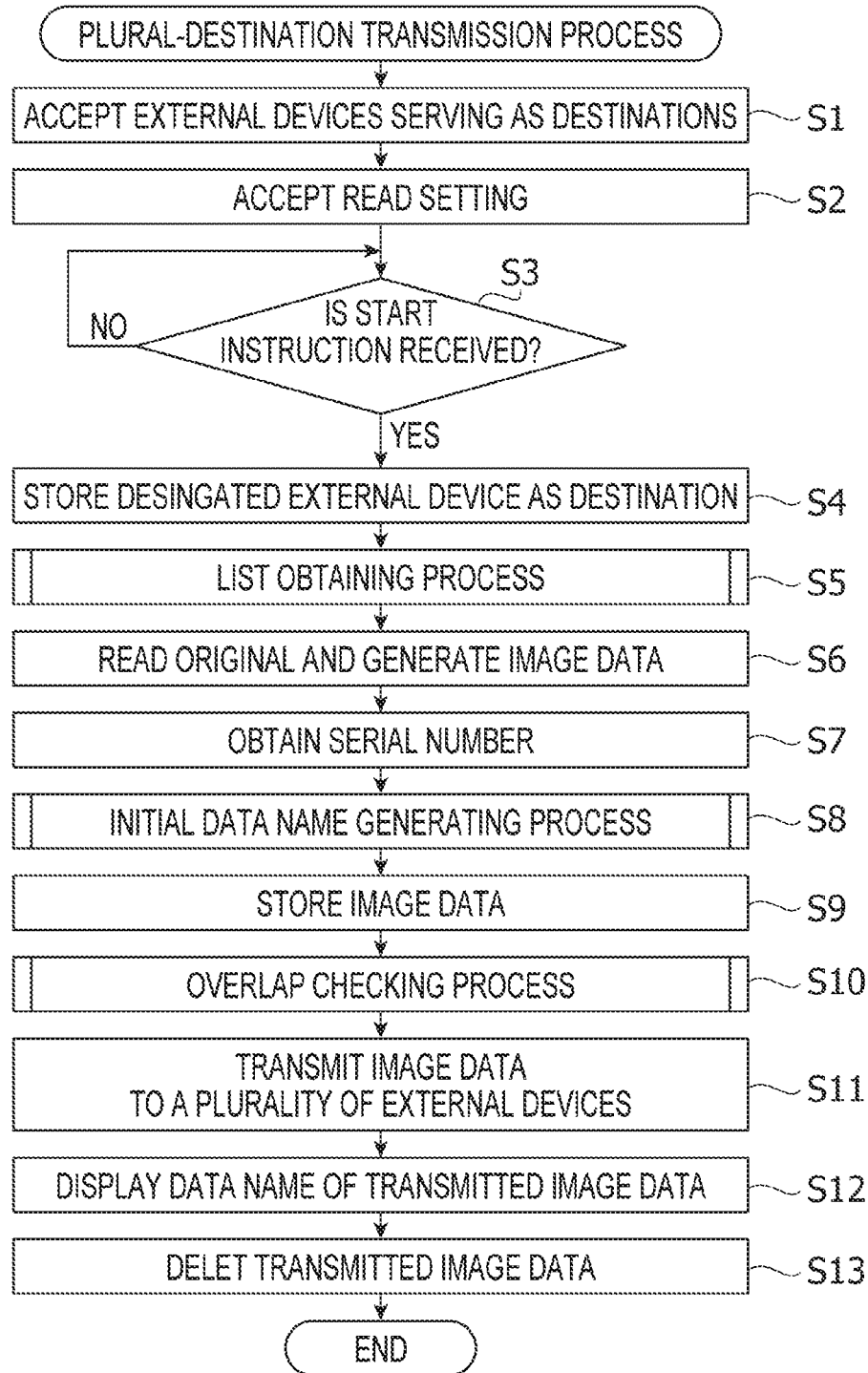
FIG. 5 is a flowchart illustrating a plural-destination transmission process.

When the initial data name automatically or manually generates is stored in the RAM 33 (S64), the CPU 31 proceeds to S9 (FIG. 5). In S9, the CPU 31 assigns the automatically or manually generated initial data name to the image data, and controls the RAM 33 to store the image data.

Next, an overlap checking process will be described referring to a flowchart shown in FIG. 8. The CPU 31 executes the overlap checking process to determine whether the data name of the image data subject to transmission overlaps one of the data names of the image data stored in the plurality of destination external devices, and change the data name of the image data subject to transmission if the name thereof overlaps one of the data names of the image data stored in the destination external devices.

Firstly, the CPU 31 retrieves the initial data name of the image data subject to transmission from the RAM 33 (S81). At this stage, the CPU 31 retrieves the same number of initial data names as the number of pieces of the image data subject to transmission.

The CPU 31 determines whether the retrieved initial data name exists in the lists obtained from the plurality of external devices (S82). The process in S82 is an example of a determining process. The CPU 31 compares the initial data name retrieved in S81 with each of the lists stored in the RAM 33, and determines whether there is a list which contains the data name same as the initial data name the CPU 31 retrieved in S81.

When the initial data name extracted in S81 does not exist in any of the lists obtained from the external devices (S82: NO), the CPU 31 proceeds to S11, and controls the network OF to transmit the image data of the original document, using the initial data name, to the plurality of external devices. That is, when the data name same as the initial data name is not included in any of the lists, the CPU 31 transmits the image data of the original document to the plurality of external devices without changing the initial data name. It is noted that the CPU 31 displays the transmitted image data on the LCD 41 (see S12 of FIG. 5) so that the user can visually recognize the data name of the transmitted image data.

In contrast, when the initial data extracted in S81 is included in at least one of the lists obtained from the external devices (S82: YES), the CPU 31 initializes a changing method by setting a change number P to "0" (S83). Then, the CPU 31 add "1" to the change number P (S84). Then, the CPU 31 starts counting the change number P of the name change list 36.

The CPU 31 retrieves the changing method corresponding to the change number P from the data name change list 36 of the NVRAM 34 (S85). For example, when the change number P is "1", the CPU 31 retrieves a changing method "initial data name+time" which is associated with the change number P=1 from the name change list 36.

Then, based on the P-th changing method retrieved from the NVRAM 34, the CPU 31 changes the existing data name stored in the RAM 33 (S86). The process in S86 is an example of the data name changing process. It is noted that the existing data name is the data name assigned to the image data stored in the RAM 33 and subject to transmission. The existing data name included not only the initial data name but another data name which is a data name having been changed from the initial data name.

Figure 7:
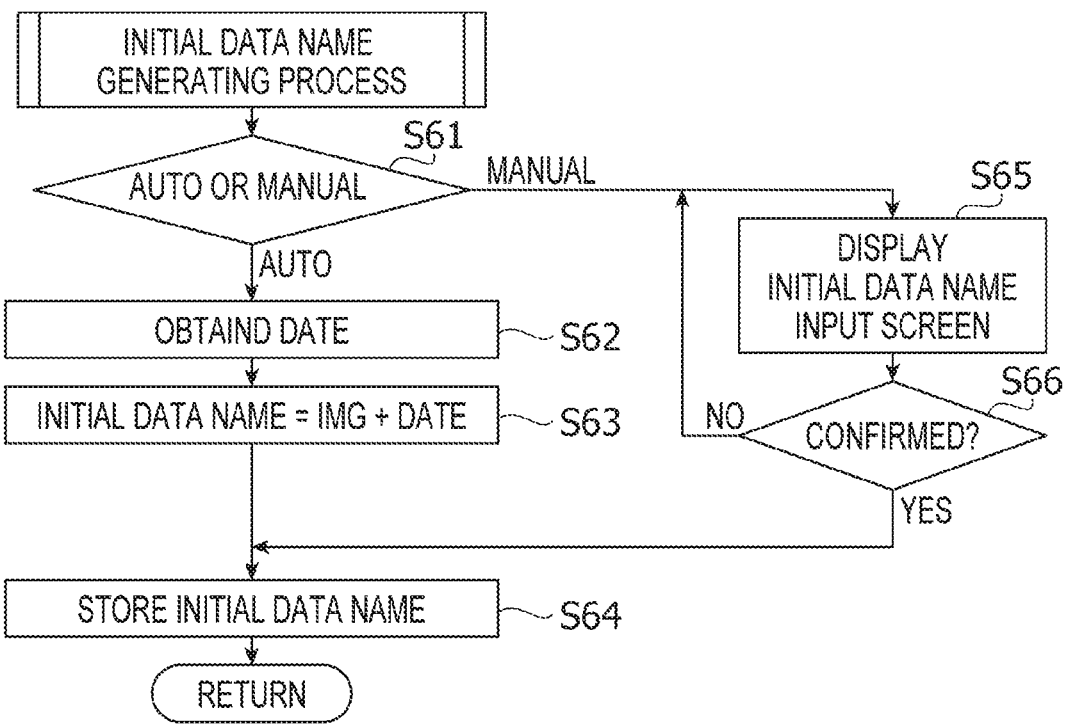
FIG. 7 is a flowchart illustrating an initial data name generating process.

When, for example, the changing method is "initial data name+time", the CPU 31 adds information corresponding to "time" stored in the RAM 33 at the end of the initial data "IMG+date" which is set in S63 of FIG. 7, thereby generating another data name "IMG+date+time" which is different from the initial data name. Then, the CPU 31 overwrites the initial data name stored in the RAM 33 with the thus generated the other data, thereby changing the initial data name to the other data name. Since the data name before changing is overwritten with the data name after changing, the available capacity of the RAM 33 can be secured. Further, since only one data name is retained, a mix-up of the data name can be prevented.

Thereafter, the CPU 31 checks whether the data name after the change does exist in any of the lists (S87). That is, the CPU 31 compares the changed data name with the lists stored in the RAM 33 to check whether the data name same as the changed data name exists in any of the lists.

When it is determined that the name same as the changed data name is note included in any of the lists (S87: NO), the CPU 31 proceeds to S11 of FIG. 5, and transmits the image data using the changed data name to the plurality of external devices. That is, when the data name to be used for the image data subject to transmission overlaps the data name of the image data registered in one or more of the transmission destination external devices, the CPU 31 resolves the overlapped state, and then transmits the image data of the original document to the plurality of external devices. After transmitting the image data, the CPU 31 displays the data names of the image data of the transmitted image data on the LCD 41 (S12 of FIG. 5), so that the user can recognize the changed data name.

Figure 8:
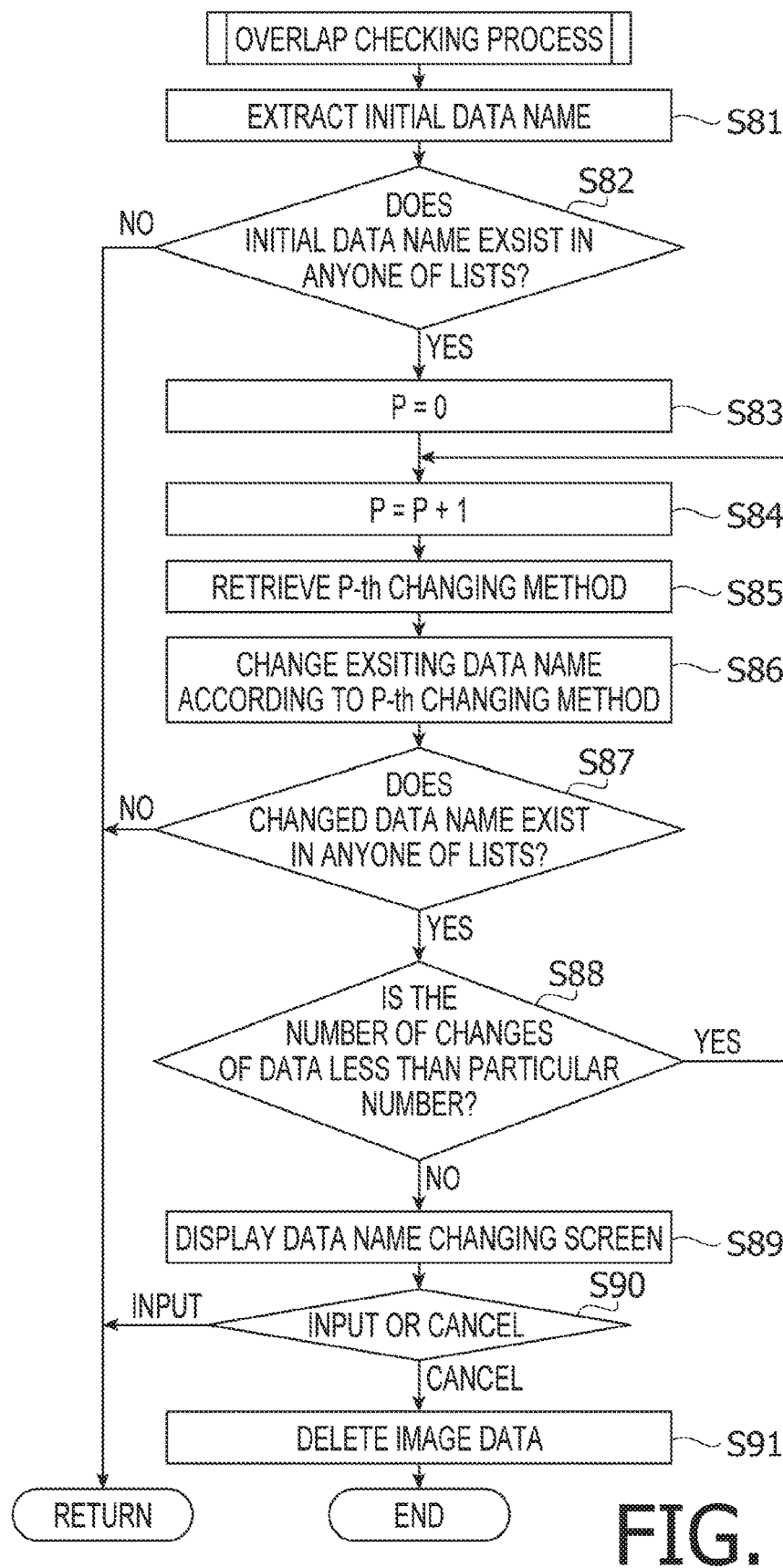
FIG. 8 is a flowchart illustrating an overlap checking process.

As shown in FIG. 8, when it is determined that the changed image data is included in any of the lists (S87: YES), the CPU 31 determines whether the number of changed times of the data name is less than a particular number (S88). The reason why the number of changed times is limited is to prevent the data name becoming too long. It is preferable that the particular number is the same as the number of changing methods registered with the name change list 36. According to the above configuration, the CPU 31 can automatically executes the changing methods registered in the name change list 36 once in each execution.

When the number of changed times of the data name is less than the particular number (S88: YES), the CPU 31 returns to S84, and adds "1" to the change number P. Accordingly, based on the changing method registered in association with the next changed number, the CPU 31 can change the changed data name stored in the RAM 33 is further changed. That is, by repeating S84-S88, the CPU 31 can automatically change the data name so that the changed data name does not overlap the data name of the image data stored in the external devices.

When the number of changed times of the data name has reached the particular number (S88: NO), the CPU 31 controls the LCD 41 to display the data name changing screen encouraging the used to input the changed data name (S89). It is likely that the data name input by the user is shorter than the data name automatically changed by the CPU 31.

When the user depresses the cancel button of the button group 42 (S90: CANCEL), the CPU 31 deletes the image data stored in the RAM 33 in order to secure the available capacity of the RAM 33 (S91). Thereafter, the CPU 31 terminates the plural-destination transmission process. That is, the CPU 31 terminates the job to transmit the image data to the plurality of external devices.

When the user operates the button group 42, inputs the changed data name through the data name change screen, and depresses the enter button, the CPU 31 determines that data name is input (S90: INPUT), and proceeds to S11 of FIG. 5. The CPU 31 transmits the image data to the plurality of external devices using the data name input by the user.

As described above, the MFP 100 according to the embodiment requests the transmission destination external devices to transmit the lists regarding the image data stored in the respective external devices, and receives the lists from the respective external devices, thereby obtaining the lists of the data names regarding the image data stored in the respective external devices. The MFP 100 causes the image reading device 20 to read the original document and generate the image data, and store the image data with assigning the initial data name thereto. The MFP 100 transmits the image data to the transmission destination external devices on condition that the initial data name of the image data subject to transmission does not exist in any of the lists obtained from the respective external devices. According to the above configuration, when the image data is transmitted, an error or overwriting due to overlapping of the image data name will not occur, and the MFP 100 can make the image data stored in all the destination external devices with using the same data name Therefore, according to the MFP 100 configured as above, the image data can be used conveniently, and further overwriting the image data can be avoided.

Figure 9:
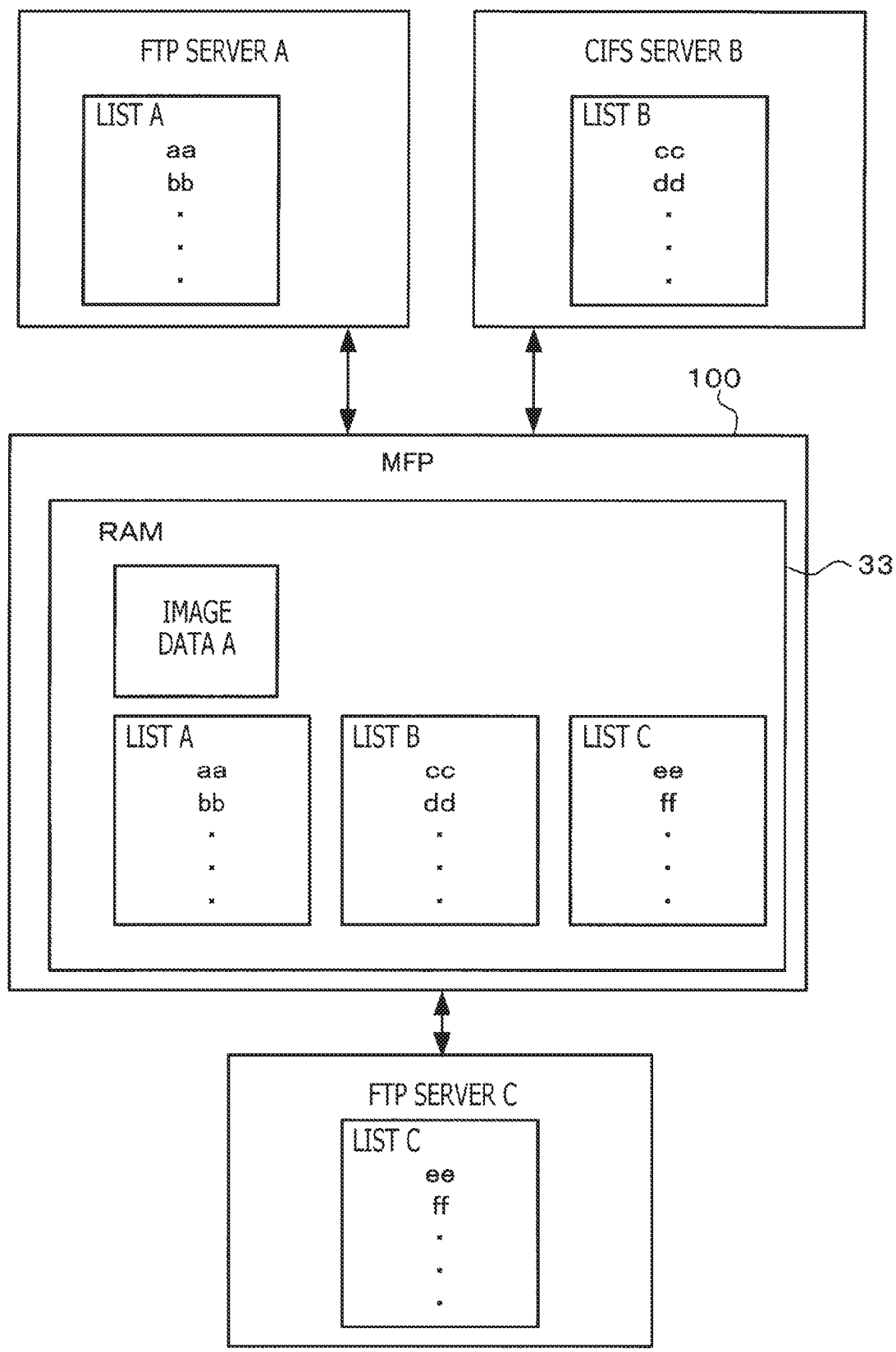
FIG. 9 is a conceptual chart illustrating a data name changing operation.

A concrete example will be described referring to FIG. 9. For example, it is assumed that a company member A of a head office is supposed to transmit an original document of a document, using the MFP 100, to an FTP server A of a branch A, a CIFS server B of a branch D, and an FTP server C of a branch E. It is also assumed that the FTP server A, the CIFS server B and the FTP server C respectively store lists A, B and C of data names regarding the image data stored in the FTP server A, the CIFS server B and the FTP server C, respectively. In the list A, for example, data names "aaa", "bbb", . . . are registered. In the list B, for example, data names "ccc", "ddd", . . . are registered. In the list C, for example, data names "eee", "fff", . . . are registered.

Firstly, the MFP 100 establishes a communication with the FTP server A, which is designated as a first transmission destination, and request the FTP server A to transmit a list of the data names regarding the image data stored in the FTP server A. After receiving the list A from the FTP server A, the MFP 100 causes the RAM 33 to store the list A. Thereafter, similarly to the above, the MFP 100 obtains the list B from the CIFS server B which is designated as the second transmission destination, and obtains the list C from the FTP server C which is designated as the third transmission destination.

After obtaining the lists A, B and C from the FTP server A, the CIFS server B and the FTP server C, the MFP 100 controls the image reading device 20 to read the image on the original document, the MFP 100 generates the image data A. The MFP 100 generates, for example, a data name "IMG1225" based on the particular character string "IMG" and a date "1225 (December 25)" as the initial data name. The MFP 100 stores the generated initial data name "IMG1225" in the RAM 33. At this stage, the MFP 100 also stores the time "16:00:35" when the image reading device 20 reads the image on the original document in the RAM 33.

Next, the MFP 100 compares the initial data name "IMG1225" with the data names registered with the lists A, B and C to determine whether a data name same as the initial data name "IMG1225" is included in any of the lists A, B and C. When it is determined that the data name same as the initial data name "IMG1215" is not included in any of the lists A, B and C, the MFP 100 transmits the image data A to which the initial data name "IMG1225" is assigned to the FTP server A, the CIFS server B and the FTP server C.

When it is determined that the data name same as the initial data name "IMG1215" is included in, for example, in the list B, that is, the initial data name overlaps the data name of the image data stored in the CIFS server B. In such a case, if the image data to which the initial data name is assigned is transmitted to the CIFS server B, the newly transmitted data overwrites the image data which was stored in the CIFS server B. Therefore, in such a case, the MFP 100 change the initial data name to another data name based on a particular changing method.

For example, the MFP 100 changes the initial data name in accordance with the order of the change number of the name change list 36 shown in FIG. 2. For the change number 1 of the name change list 36, a changing method to add information regarding the time at the end of the initial data name is registered. Thus, the MFP 100 retrieves the time "16:00:35" at which the image reading device 20 read the image on the original document from the RAM 33. Then, the MFP 1100 adds information corresponding to the time "16:00:35" at which the image on the original document was read at the end of the initial data name "IMG1225" to generate another data name "IMG1225160035". The MFP 100 overwrites the initial data name "IMG1225" with the other (i.e., newly generated) data name "IMG1225160035" as the data name of the image data A.

When it is confirmed that the other data name "IMG1225160035" is not included in any of the lists A, B and C, the MFP 100 transmits the image data A, using the other (i.e., newly generated) data name "IMG1225160035", to the FTP server A, the CIFS server B and the FTP server C.

As described above, the MFP 100 transmits the image data A using the data name which is different from the data names regarding the image data stored in the FTP server A, the CIFS server B and the FTP server C. Therefore, the MFP 100 is capable of avoiding a situation where the image data A cannot be transmitted to the FTP server A, the CIFS server B or the FTP server C because the data name of the image data A is the same as one of the data names stored in the FTP server A, the CIFS server B or the FTP server C. Further, the MFP 100 stores the image data A in the FTP server, the CIFS server B and the FTP server C using the same data name. Therefore, the company staffs of the head office, the branches A, D and E can identify the image data A referring to the same data name, thereby operability of the image data A being improved. Further, in the branches A, D and E, a situation that the image data stored in the FTP server A, the CIFS server B and the FTP server C is overwritten with the image data received from the MFP 100 can be avoided.

Further, the MFP 100 displays the data name which was used when the image data was successfully transmitted to the FTP server A, the CIFS server B and the FTP server C on the LCD 41. Therefore, for example, when the company staff A of the head office manually input the initial data name, and the MFP 100 automatically changed the manually input initial data name to another data name in order to avoid overlapping of the data name, the company staff A can recognizes the changed data name by viewing the indication displayed on the LCD 41, the image data A can be handled conveniently.

It is noted that, even if the initial data name is changed to another data name, there could be a case where the changed data name still exists in the list A, B or C. For example, a device different from the MFP 100 may transmit image data X is transmitted to the FTP server A using the data name "IMG1225160035" which is the same as the changed data name generated in the MFP 100. In such a case, the changed data name generated by the MFP 100 exists in the list A.

In such a case, the MFP 100 further changes the other data to another data (hereinafter, referred to as 2nd other data).

For example, when the other data name, which is data name generated by changing initial data name in accordance with the change number 1 of the name change list 36 shown in FIG. 2 exists in the list A, the MFP 100 retrieves the changing method associated with the number two of the name change list 36. The retrieved changing method is a method to add information corresponding to the device-intrinsic information and its serial number at the end of the initial name. Therefore, the MFP 100 obtains the device-intrinsic information and the serial number of itself. Then, the MFP 100 generates the second other name, which is different from the intimal data name or the other data name, by adding the device-intrinsic information and the serial number at the end of the initial data name "IMG1225". The MFP 100 overwrites the other data name "IMG1225" with the newly generated second other name, and stores the same as the data name of the image data A in the RAM 33.

Thereafter, the MFP 100 checks whether the second other name is included in the lists A, B and C. When the data name same as the second other data name is not included in the lists A, B and C, the MFP 100 transmits the image data A to the FTP server A, the CIFS server B and the FTP server C using the second other name.

When it is determined that the data name same as the second other name exists in the list A, B or C, the MFP 100 change the data name according to a further changing method. For example, the MFP 100 retrieves the changing method associated with the number three of the name change list 36. The retrieved changing method is a method to add the time "16:00:35" stored in the RAM 33, the device-intrinsic information and its serial number at the end of the initial name "IMG1225", thereby generating third other name, which is different from the intimal data name, the other data name, or the second other name. Thereafter, the MFP 100 checks whether the third other name is included in the lists A, B and C. When the data name same as the third other data name is not included in the lists A, B and C, the MFP 100 transmits the image data A to the FTP server A, the CIFS server B and the FTP server C using the third other name.

As above, the MFP 100 compares the data name which has been changed with the obtained lists A, B and C. If the data name same as the changed data name is included in the list A, B or C, the MFP 100 further changes the data name. That is, the MFP 100 automatically changes the data name. Accordingly, overlapping of the data name can be unfailingly avoided.

It is noted that the automatic changing of the data name is repeated, the data name may become longer and longer since the MFP 10 changes the data name by combining information the MFP 100 is capable of obtaining or simply listing the obtained pieces of information serially. The long, redundant data name is inconvenient. Therefore, according to the embodiment, there is an upper limit of the number of automatic changes of the data name (see S88).

Figure 10:
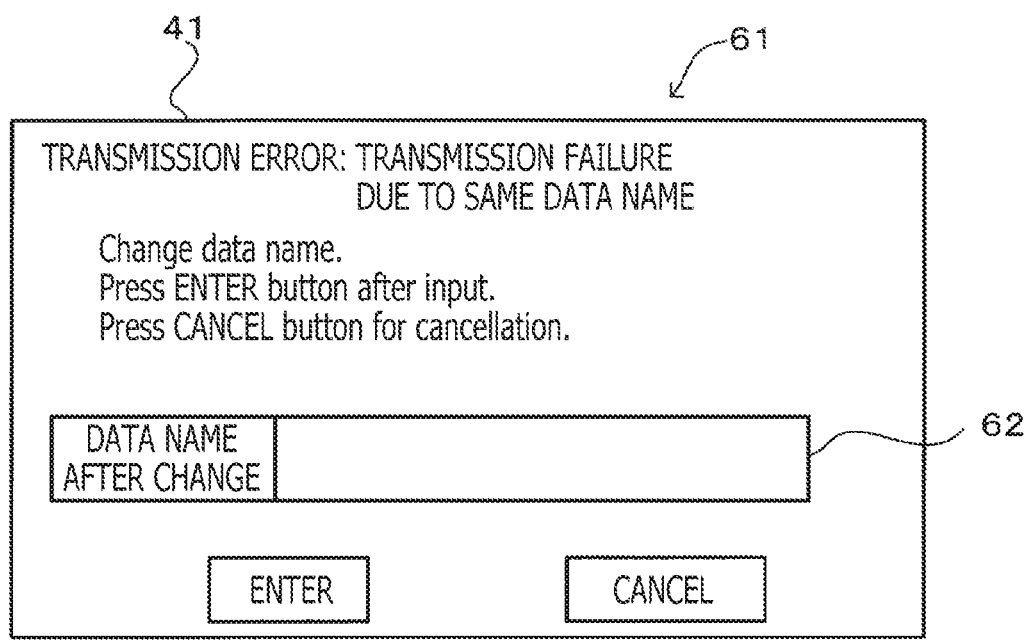
FIG. 10 is an example of a data name changing screen.

It is, for example, assumed that the upper limit of the number of automatic changes (i.e., the particular number) is "3" which is the number of the changing methods registered with the name change list 36 shown in FIG. 2. When the number of automatic changes has reached "3", that is, even though all the registered changing methods have been executed but overlapping of the data name cannot be resolved, the MFP 100 displays a data name change screen 61 shown in FIG. 10 on the LCD 41. On the data name change screen 61, a message indicating that the image data cannot be transmitted since the data having the same data name exists in the transmission destination, and an input field 62 to input a changed data name is provided. The user is encouraged to input the new data name in the input field 62. By relegating the change of the data name to the user, it may be possible to prevent the data name from being redundant.

After the changed data name is input by the user is received through the data name change screen 61, the MFP 100 transmits, using the changed data name, the image data A is transmitted to the FTP server A, the CIFS server B and the FTP server C. If the user does not change the data name through the data name change screen 61, the MFP 100 deletes the image data A from the RAM 33 and aborts transmission of the image data A. The transmission is aborted to avoid a case where the image data A is transmitted with the data name which overlaps at least one of the data names if the image data stored in the FTP server A, the CIFS server B and the FTP server C, and the existing image having the data name same as the data name of the image data A is overwritten with the image data A.

It should be noted that the above-described embodiment is only an exemplary embodiment and the aspect of the disclosure should not be limited to the above-described embodiment. Rather, various modifications and improvements of the above-described embodiment should be included within the aspects of the present disclosures. For example, the MFP 100 may be any other device which has an image reading function, and could be a scanner.

For example, the CPU 31 may establish communication with all of the plurality of external devices at the same time, transmit the request for the lists to all of the plurality of external device and receive the same at the same time.

For example, the number of changes of the data name may be one. That is, the steps of S87-S91 of FIG. 8 may be omitted, and after changing of the data name from the initial data name to the other data name, the image data may be transmitted to the plurality of external devices. Alternatively, the steps S87-S91 may be omitted, the MFP 100 may change the data name once from the initial data name to the other data name, and (a) the MFP 100 may transmit the image data to the plurality of external devices if the other data name (i.e., the change data name) is not included in the lists or (b) the MFP 100 may abort transmission of the image data to anyone of the plurality of external devices if the other data name (i.e., the change data name) is included in the lists. Further, the number of changes of data name may be two, four or more than four. Further, the number of changes of data name may be set regardless of the number of changing methods registered with the name change list 36.

Changing method of the data name may be limited to the automatic changing method. That is, S89 and S90 of FIG. 8 may be omitted. Alternatively, the changing method of the data name may be limited to the manual changing method. That is, S83-S86 of FIG. 8 may be omitted, and the CPU 31 may immediately display the data name change screen 61 on the LCD 41 if there exists the data name same as the initial data name in any of the lists obtained from the plurality of external devices. It this case, the CPU 31 may determine whether the data name input by the user exists in the lists obtained from the plurality of external devices, and may encourage the user to input another data name if it is determined that the data name previously input by the user exists in the lists obtained from the plurality of external devices.

It is noted that, on the data name change screen 61, the data name determined to overlap the existing data name in any of the lists may be displayed. With this information, the user may easily input a data name avoiding overlapping issue.

It is note that S89-S91 in FIG. 8 may be omitted. That is, if the changed data name still exists in the lists obtained from the plurality of external devices after the data name has been changed by the particular number of times (S88: YES), a job to transmit the image data may be aborted. By setting the upper limit to the number of changes of the data name, it is possible to avoid the data name becoming redundantly long and handling of the same becoming inconvenient.

Further, the MFP 100 may omit S12 of FIG. 5. That is, the MFP 100 may not display the data name of the transmitted image data on the LCD 41 after the image data is transmitted.

Figure 6:
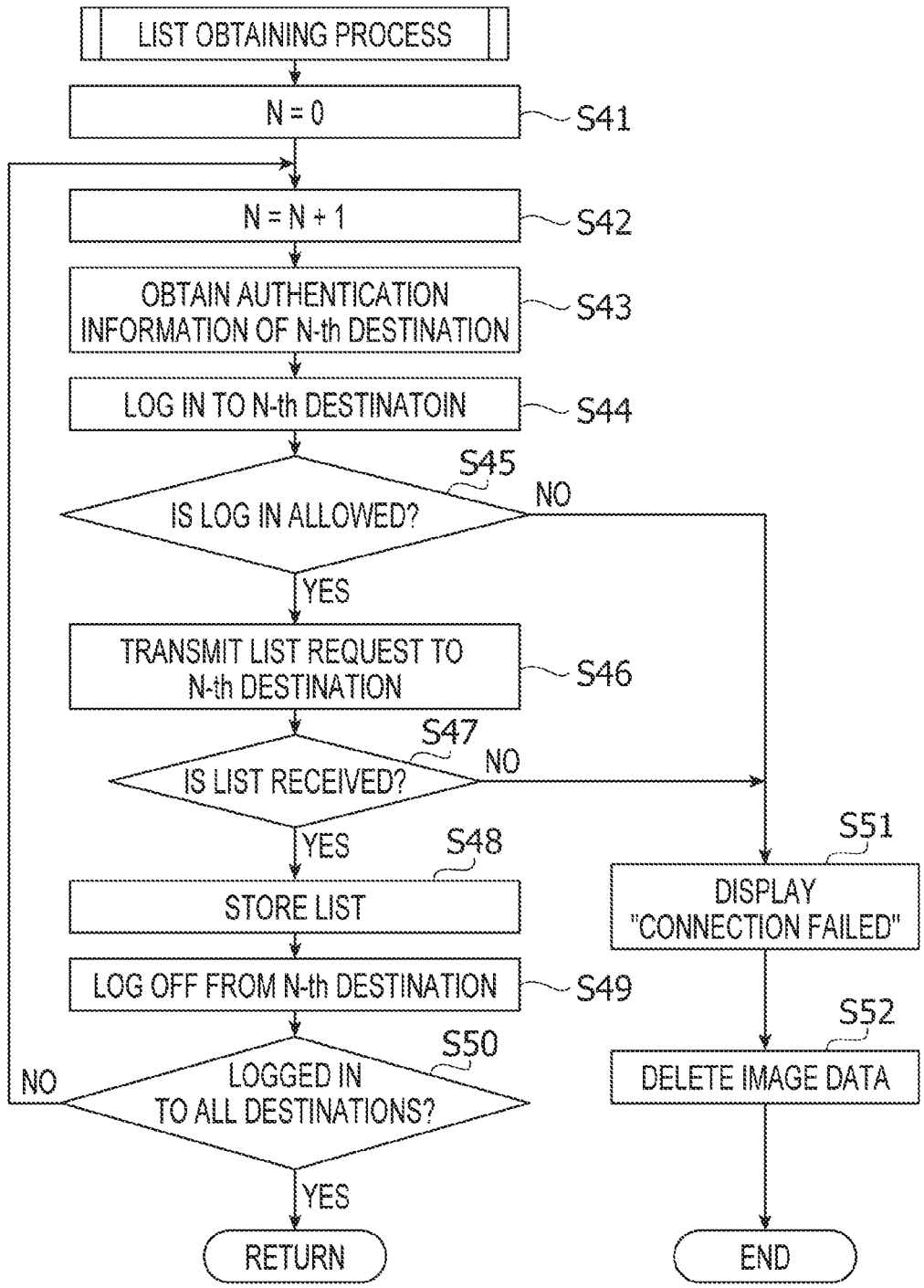
FIG. 6 is a flowchart illustrating a list obtaining process.

For example, when the MFP 100 cannot connect with one of the external devices when the lists are obtained therefrom, the MFP 100 may omit S52 of FIG. 6. That is, the MFP 100 may not delete the image data which was generated by reading the image on the original document. By retaining the image data of the original document, it becomes possible to omit the reading operation of the original document when transmission of the image data is re-attempted.

In S11 of FIG. 5, the image data may be transmitted to the plurality of external devices at the same time.

The processes disclosed in the above-described embodiment may be executed by hardware such as a single CPU, a plurality of CPU's and/or an ASIC or a combination thereof. Further, the processes disclosed in the embodiment may be realized by a non-transitory computer-readable recording medium containing programs to execute such processes, methods of performing such processes and/or any other suitable modes.

What is claimed is:

1. An image reading device, comprising:
an image reader configured to read an image on an original document and generate image data corresponding to the image on the original document;
a communication interface configured to communicate with a first external device and a second external device;
a storage; and
a controller,
wherein, when the first external device and the second external device are designated as transmission destinations of the image data, the controller is configured to:
control the image reader to read the image on the original document and generate the image data;
store the image data generated in the storage with assigning an initial data name to the image data;
control the communication interface to:
transmit a first list request, to the first external device, requesting to transmit a first list to the image reading device, the first list being a list of data names regarding image data stored in the first external device;
transmit a second list request, to the second external device, requesting to transmit a second list to the image reading device, the second list being a list of data names regarding image data stored in the second external device;
receive the first list transmitted from the first external device;
receive the second list transmitted from the second external device;
determine whether a data name that is a same as the initial data name of the image data stored in the storage is included in at least one of the first list and the second list;
change the initial data name of the image data stored in the storage to an other data name different from the initial data name when it is determined that the data name that is the same as the initial data name of the image data stored in the storage is included in at least one of the first list and the second list;
determine whether the other data name of the image data is included in at least one of the first list and the second list;
when it is determined that the other data name is included in at least one of the first list and the second list, the controller does not transmit the image data with the other data name when a condition occurs,
when it is determined that the other data name is not included in any of the first list and the second list, the controller controls the communication interface to transmit the image data with the other data name to the first external device and the second external device, and
when it is determined that the initial data name is not included in any of the first list and the second list, the controller does not change the initial data name and controls the communication interface to transmit the image data with the initial data name to the first external device and the second external device.

2. The image reading device according to claim 1, wherein the controller changes the initial data name of the image data stored in the storage by adding information regarding a time at which the image data was generated at an end of the initial data name of the image data stored in the storage when it is determined that the data name that is the same as the initial data name of the image data stored in the storage is included in at least one of the first list and the second list.

3. The image reading device according to claim 1, wherein the controller generates the initial data name of the image data in accordance with a first generation rule, the first generation being a data name generation rule, and
wherein the controller changes the initial data name of the image data to the other data name which is generated in accordance with a second data name generation rule different from the first data name generation rule.

4. The image reading device according to claim 1, wherein the controller is further configured to:
when it is determined that the other name of the image data which has been changed is included in at least one of the first list and the second list, change the other data name of the image data to a second other data name which is different from the other data name; and
after the other data name is changed to the second other data name, control the communication interface to transmit the image data stored in the storage to the first external device and the second external device.

5. The image reading device according to claim 4, wherein, when the second other data name of the image data is included in at least one of the first list and the second list even though a data name of the image data has been changed by a particular number of times, the controller is configured to abort the job to transmit the image data stored in the storage to the first and second external devices.

6. The image reading device according to claim 4, further comprising an inputting device,
wherein, when the second other data name of the image data is included in at least one of the first list and the second list even though the data name of the image data has been changed by a particular number of times, the controller controls the inputting device to:
acquire input of a new data name; and
change the second other data name of the image data stored in the storage to the new data name input through the inputting device.

7. The image reading device according to claim 1, further comprising a display device configured to display an image,
wherein the controller controls the display device to display the data name of the image data after transmitting the image data stored in the storage to the first and second external device.

8. An image reading device, comprising:
an image reader configured to read an image on an original document and generate image data corresponding to the original document;
a communication interface configured to communicate with a plurality of external devices;
a storage; and
a controller,
wherein, when a first external device and a second external device of the plurality of external devices are designated as transmission destinations of the image data, the controller is configured to:
store the image data generated in the storage with assigning an initial data name to the image data;
control the communication interface to transmit a list request, to each of the plurality of external devices, requesting to transmit a list to the image reading device, the list being a list of data names regarding image data stored in the each of the plurality of external devices;

control the communication interface to receive the list transmitted from each of the plurality of external devices;

determine whether a data name that is a same as the initial data name of the image data stored in the storage is included in at least one of the lists respectively received from the plurality of external devices;

change the initial data name of the image data stored in the storage to an other data name different from the initial data name when it is determined that the data name that is the same as the initial data name of the image data stored in the storage is included in at least one of the lists respectively received from the plurality of external devices;

determine whether the other data name of the image data is included in at least one of the lists respectively received from the plurality of external devices;

when it is determined that the other data name is included in at least one of the lists respectively received from the plurality of external devices, the controller does not transmit the image data with the other name, when it is determined that the other data name is not included in any of the lists respectively received from the plurality of external devices, the controller controls the communication interface to transmit the image data with the other data name to the first external device and the second external device, and when it is determined that the initial data name is not included in any of the lists respectively received from the plurality of external devices, the controller does not change the initial data name and controls the communication interface to transmit the image data with the initial data name to the first external device and the second external device.

9. An image data transmission method of an image reading device having an image reader configured to read an image on an original document and generate image data corresponding to the original document, a communication interface configured to communicate with a first external device and a second external device, and a storage, wherein, when the first external device and the second external device are designated as transmission destinations of the image data, the method includes:

controlling the image reader to read the image on the original document and generate the image data;

storing the image data generated in the storage with assigning an initial data name to the image data;

transmitting a first list request, to the first external device, requesting to transmit a first list to the image reading device, is the first list being a list of data names regarding image data stored in the first external device;

transmitting a second list request, to the second external device, requesting to transmit a second list to the image reading device, the second list being a list of data names regarding image data stored in the second external device;

receiving the first list transmitted from the first external device;

receiving the second list transmitted from the second external device;

determining whether a data name that is a same as the initial data name of the image data stored in the storage is included in at least one of the first list and the second list;

changing the initial data name of the image data stored in the storage to an other data name different from the initial data name when it is determined that the data name that is the same as the initial data name of the image data stored in the storage is included in at least one of the first list and the second list;

determining whether the other data name of the image data is included in at least one of the first list and the second list;

when it is determined that the other data name is included in at least one of the first list and the second list, not transmitting the image data with the other data name:

when it is determined that the other data name is not included in any of the first list and the second list, controlling the communication interface to transmit the image data with the other data name to the first external device and the second external device; and when it is determined that the initial data name is not included in any of the first list and the second list, not changing the initial data name of the image data stored in the storage and controlling the communication interface to transmit the image data with the initial data name to the first external device and the second external device.

10. An image reading device, comprising:

an image reader configured to read an image on an original document and generate image data corresponding to the image on the original document;

a communication interface configured to communicate with a first external device and a second external device;

a storage; and a controller, wherein, when the first external device and the second external device are designated as transmission destinations of the image data, the controller is configured to:

control the image reader to read the image on the original document and generate the image data;

store the generated image data in the storage with assigning an initial data name to the image data;

control the communication interface to:

transmit a first list request, to the first external device, requesting to transmit a first list to the image reading device, the first list being a list of data names regarding image data stored in the first external device;

transmit a second list request, to the second external device, requesting to transmit a second list to the image reading device, is the second list being a list of data names regarding image data stored in the second external device,;

receive the first list transmitted from the first external device; and receive the second list transmitted from the second external device;

determine whether a data name that is a same as the initial data name of the image data stored in the storage is included in at least one of the first list and the second list;

change the initial data name of the image data stored in the storage to an other data name different from the initial data name and included in neither of the first list and the second list when it is determined that the data name that is the same as the initial data name of the image data stored in the storage is included in at least one of the first list and the second list; and not changing the initial data name of the image data stored in the storage when it is determined that the data name that is the same as the initial data name of the image data stored in the storage is not included in any of the first list and the second list; and control the communication interface to transmit the image data stored in the storage to the first external device and the second external device with either the initial data name or the other data name, wherein, the controller changes the initial data name of the image data stored in the storage by adding information regarding a time at which the image data was generated at an end of the initial data name of the image data stored in the storage when it is determined that the data name that is the same as the initial data name of the image data stored in the storage is included in at least one of the first list and the second list.

\* \* \* \* \*